US012719278B2

(12) United States Patent
Chhabra et al.

(10) Patent No.: US 12,719,278 B2
(45) Date of Patent: Aug. 25, 2026

(54) METHOD AND SYSTEM FOR POWER MANAGEMENT

(71) Applicant: Arm Limited, Cambridge (GB)

(72) Inventors: Amit Chhabra, Noida (IN); Ranabir Dey, Bangalore (IN); Rainer Herberholz, Great Abington (GB); Kedhar Malla, Bangalore (IN); Vijaya Kumar Vinukonda, Bangalore (IN)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/981,981

(22) Filed: Dec. 16, 2024

(65) Prior Publication Data

US 2026/0171804 A1 Jun. 18, 2026

(51) Int. Cl.
*G06F 1/32* (2019.01)
*H02J 3/04* (2006.01)

(52) U.S. Cl.
CPC .................................... *H02J 3/04* (2013.01)

(58) Field of Classification Search
CPC ........ H02J 3/04; H02J 3/06; H02J 3/08; H02J 3/10; H02J 3/12; H02J 3/14
See application file for complete search history.

(56) References Cited

U.S. PATENT DOCUMENTS

| | | | | |
|---|---|---|---|---|
| 5,031,176 A * | 7/1991 | Magne | H04L 25/085 340/2.23 |
| 12,483,120 B2 * | 11/2025 | Chang | H02M 3/33571 |
| 2018/0004276 A1 * | 1/2018 | Wong | H02J 1/08 |
| 2018/0284859 A1 * | 10/2018 | Pant | G06F 1/3243 |
| 2024/0332968 A1 * | 10/2024 | Zhang | H02J 9/062 |

* cited by examiner

*Primary Examiner* — Ryan Johnson
*Assistant Examiner* — Esayas G Yeshaw
(74) *Attorney, Agent, or Firm* — DeWitt LLP

(57) ABSTRACT

The present technology is directed to a method, circuit and system for improved power management, and in an aspect there is provided control circuitry for controlling operation of an associated power multiplexer circuit, the control circuitry including: a first input to receive a first voltage; a second input to receive a second voltage; comparator circuitry to determine the level of the first voltage relative to the second voltage and to generate a first control signal when the second voltage reaches a first threshold level relative to the first voltage, where the first control signal is to indicate a desired output of the associated power multiplexer circuit.

18 Claims, 9 Drawing Sheets

200

METHOD AND SYSTEM FOR POWER MANAGEMENT

TECHNICAL FIELD

Present techniques relate generally to power management in an integrated device(s).

BACKGROUND

Integrated circuit (IC) devices include processing components such as a central processing unit (CPU), a graphics processing unit (GPU) as well as processing components optimised for neural networks used in machine learning and artificial intelligence applications. Applications of these processing components are many and varied and include general purpose computing applications as well as use in smartphones, personal computer and mobile gaming, embedded systems, autonomous vehicles, data centres and high-performance computing.

Depending on the deployed architecture and application, processors can vary greatly in terms of performance, power consumption and scalability.

SUMMARY

The present technology is directed to a method and circuit for improved power management.

In a first aspect there is provided control circuitry for controlling operation of an associated power multiplexer circuit, the control circuitry comprising: a first input to receive a first voltage; a second input to receive a second voltage; comparator circuitry to determine the level of the first voltage relative to the second voltage and to generate a first control signal when the second voltage reaches a first threshold level relative to the first voltage, where the first control signal is to indicate a desired output of the associated power multiplexer circuit.

In a further aspect there is provided a method of operating control circuitry for controlling operation of an associated power multiplexer circuit, the method comprising: receiving a first input comprising first voltage; receiving a second input comprising a second voltage; determining, using comparator circuitry, a level of the first voltage relative to the second voltage; generating a first control signal when the second voltage reaches a first threshold level relative to the first voltage, where the first control signal is to indicate a desired output of the associated power multiplexer circuit.

In a further aspect of there is provided a non-transitory computer readable storage medium comprising code which when implemented on a processor causes the processor to carry out the method of the previous aspect.

In a further aspect there is provided a power control system comprising: power multiplexer circuitry comprising: a first input to receive a first voltage; a second input to receive a second voltage; an output to provide a third voltage, where the output is to track the first voltage or the second voltage responsive to a first control signal; control circuitry comprising: a first input to receive the first voltage; a second input to receive the second voltage; comparator circuitry to determine the level of the first voltage relative to the second voltage and to generate the first control signal when the second voltage reaches a first threshold level relative to the first voltage, where the first control signal is to indicate a desired output of the associated power multiplexer circuit.

In a further aspect there is provided a system comprising: the circuitry of the first aspect, implemented in at least one packaged chip; at least one system component; and a board, wherein the at least one packaged chip and the at least one system component are assembled on the board.

In a further aspect there is provided a chip-containing product comprising the above system assembled on a further board with at least one other product component.

In a further aspect there is provided a non-transitory computer-readable medium to store computer-readable code for fabrication of the circuitry of the first aspect.

BRIEF DESCRIPTION OF THE DRAWINGS

Implementations of the disclosed technology will now be described, by way of example only, with reference to the accompanying drawings, in which.

DETAILED DESCRIPTION

Various implementations described herein are directed to power management in integrated circuit (IC) systems.

Typical integrated circuit systems comprise one or more subsystems, such as a central processor unit (CPU), graphics processor unit (GPU), where each subsystem may have associated storage or memory circuitry, such as random access memory (RAM) (e.g. static RAM (SRAM)).

Such storage circuitry may include one or more storage cells (hereafter "bitcells") arranged in one or more arrays (hereafter "bitcell arrays"). The bitcells may be arranged in rows and columns in the bitcell arrays, where individual bitcells in the rows may be addressed/selected via respective wordlines and individual bitcells in each column may be addressed/selected via respective bitlines. The storage cells may be supplied by a first voltage at a first voltage level, which is hereafter referred to as a "cell voltage level" or "VDDCE".

The storage circuitry may have associated peripheral circuitry to address/select individual bitcells via the wordlines and bitlines (to write to and read from the individual bitcells) and to sense data stored in the bitcells via the wordlines and bitlines. The peripheral circuitry may be supplied by a second voltage at a second voltage level, which is hereafter referred to as a "peripheral voltage level"

or "VDDPE". There is also logic within any subsystem that can share the same supply as the VDDPE.

Figure 1A:
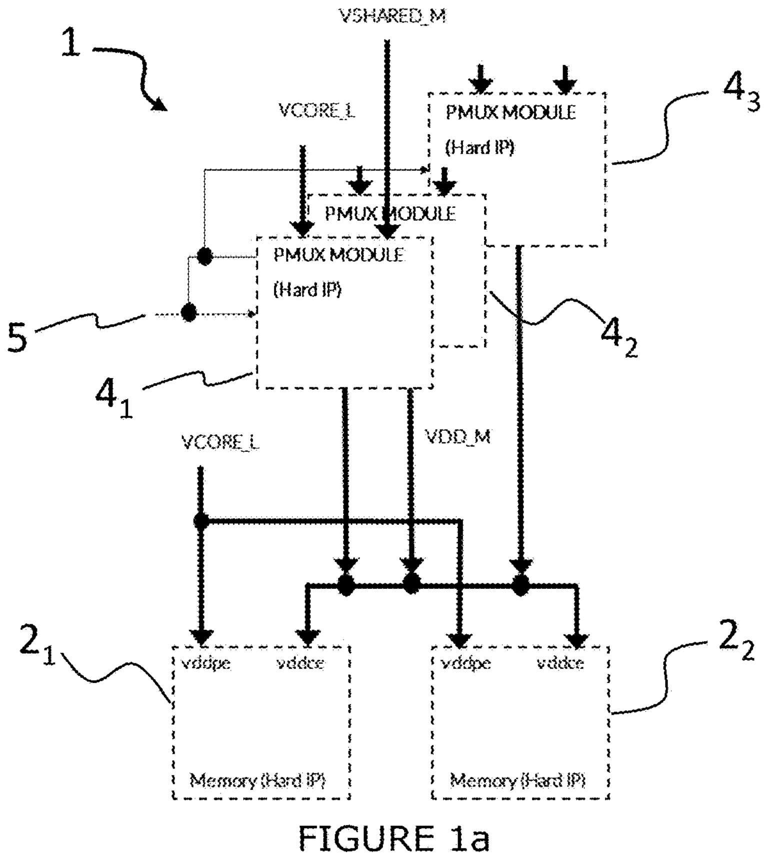
FIG. 1*a* shows a conventional system having power multiplexer modules.

As depicted in FIG. 1*a*, a conventional system 1 may comprise multiple storage circuits 2*n* (two of which are depicted in FIG. 1*a*), each comprising cell circuitry (not shown) supplied with a first voltage (VDD_M) via a vddce input and peripheral circuitry (not shown) supplied with a second voltage (VDDPE) via a vddpe input.

One or more power multiplexer (PMUX) modules $\mathbf{4}_m$ (three of which are depicted in FIG. 1*a*) may be arranged to supply VDD_M to the cell circuitry of the respective storage circuits.

Each PMUX module $\mathbf{4}_m$ receives a nominal voltage (VSHARED_M) and a core voltage (VCORE_L), and selects VDD_M to substantially track one of VSHARED_M and VCORE_L.

In the conventional system depicted in FIG. 1*a*, a firmware control signal 5 is used to control the PMUX modules to select VDD_M to substantially track one of VSHARED_M or VCORE_L. Therefore, VDD_M is to track VSHARED_M or VCORE_L responsive to firmware signal 5.

The storage cells $\mathbf{2}_n$ may have a minimum operating voltage (e.g. as specified by a foundry or by design). In the present illustrative examples, the nominal voltage (VSHARED_M) is set at the minimum operating voltage of the storage cells, which is taken to be 0.75 v.

The peripheral circuitry may operate at a lower voltage than the minimum operating voltage of the storage cells. In the present illustrative example, the core voltage (VCORE_L) may be supplied in the operational range of the peripheral circuitry (e.g. from $\text{VCORE\_L}_{Min}$=0.55 v to $\text{VCORE\_L}_{Max}$=0.95 v). VCORE_L may be adjusted for, for example, dynamic voltage and scaling (DVFS) sequence operations, where operating with VCORE_L below the nominal voltage (VSHARED_M) may improve power efficiency but may negatively affect performance, whereas operating with VCORE_L above the nominal voltage may improve performance but reduce power efficiency.

When the level of voltage VCORE_L supplied to the peripheral circuitry is greater than the nominal voltage (VSHARED_M), the cell circuitry should be supplied with VDD_M that substantially tracks (or is substantially equal to) VCORE_L or system performance may be affected (E.g. due to timing issues, read and/or write stability issues).

Figure 1B:
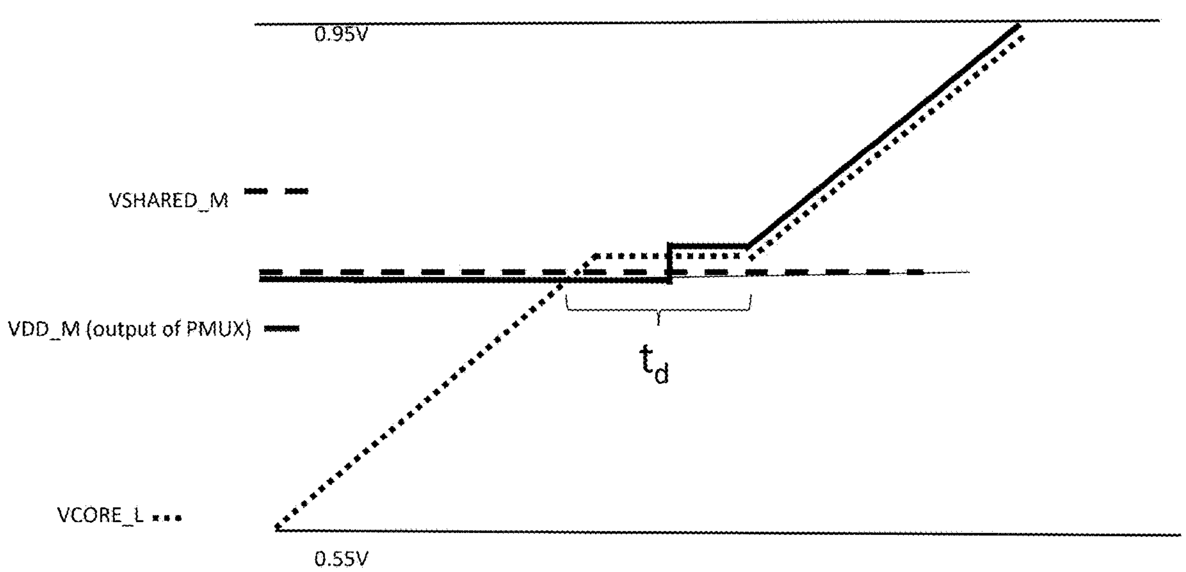
FIG. 1*b* shows an example waveform depicting the operation of a conventional power multiplexer module.

Therefore, as depicted in FIG. 1*b*, when VCORE_L≤VSHARED_M, the PMUX modules $\mathbf{4}_n$ the output VDD_M of the PMUX modules $\mathbf{4}_m$ should track VSHARED_M, and when VCORE_L>VSHARED_M, the output VDD_M of the PMUX modules $\mathbf{4}_m$ should track VCORE_L. In conventional systems, a system control processor (SCP) may interact with a power management integrated circuit (PMIC) to control the level of VCORE_L and firmware (FW) may be provided to monitor or sense the level of VCORE_L relative to VSHARED_M, and to control the output VDD_M of the PMUX modules $\mathbf{4}_m$. Such sensing may be done, for example using a delay monitor or internal timer based on programmable ramp rate of the PMIC.

As an example, it may be desired for VCORE_L to be increased from $\text{VCORE\_L}_{Min}$ to $\text{VCORE\_L}_{Max}$ (e.g. during a DVFS sequence). In operation, the SCP may first request the PMIC to raise VCORE_L to the same level as VSHARED_M. When firmware determines that VCORE_L is stable at the same level as VSHARED_M, the SCP may then request that the PMIC raise VCORE_L to $\text{VCORE\_L}_{Max}$, and instruct/control the PMUX module(s), via a firmware signal, to select VDD_M to substantially track VCORE_L.

As indicated by delay time ($t_d$) in FIG. 1*a*, the firmware needs time to sense that VCORE_L is stabilised at VSHARED_M before requesting the PMIC to raise VCORE_L to $\text{VCORE\_L}_{Max}$ and instructing/controlling the PMUX module(s), where such functionality may impact the time to carry out a DVFS sequence change. In addition, the firmware may need to carry out two requests to the PMIC which may also impact the time to carry out a DVFS sequence change.

The present techniques seek to improve the controlling the PMUX modules to, for example, improve the efficiency of DVFS operations.

Figure 2:
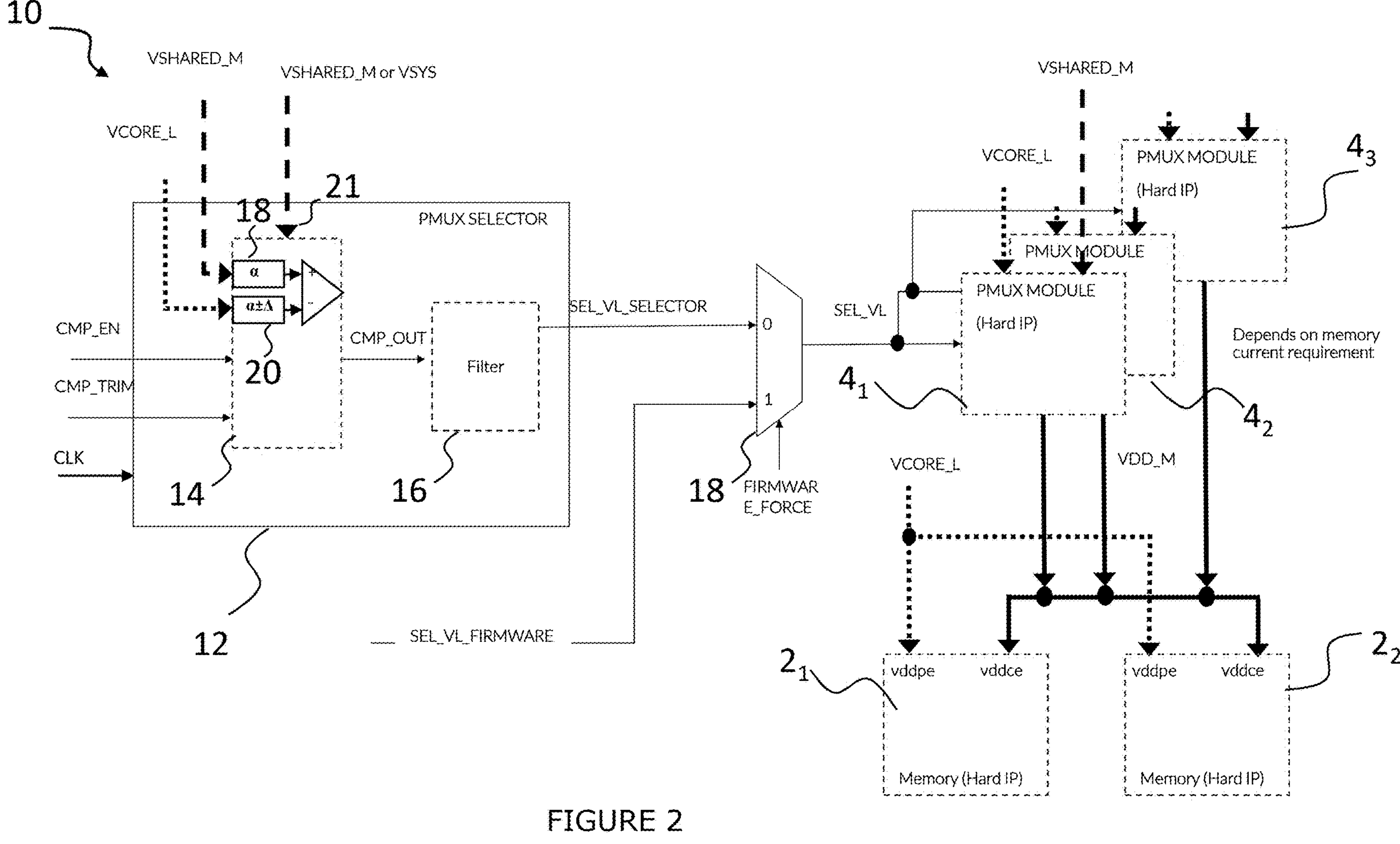
FIG. 2 shows selector circuitry for controlling a power multiplexer module in accordance with the present techniques.

In accordance with the present techniques, as depicted in FIG. 2, there is provided a system 10 comprising PMUX selector circuitry 12, which is to generate a control (or configuration setting) signal to indicate how (control) the PMUX modules $\mathbf{4}_m$ are to select (control) VDD_M to substantially track VCORE_L or VSHARED_M.

Each PMUX module $\mathbf{4}_m$ may be taken to be a power switch to supply an output VDD_M (as VDDCE) to the storage cells $\mathbf{2}_m$.

In FIG. 2, three PMUX modules $\mathbf{4}_m$ are depicted, but the claims are not limited to three. In embodiments, the number of PMUX modules $\mathbf{4}_m$ may depend on the current (I) requirements of the stem system 10, where additional PMUX modules may be added to a system dependent on the current (I) requirements for that system. In addition, the PMUX module can also reside inside the SRAM instance.

The PMUX selector circuitry 12 comprises comparator circuitry 14 which is to generate a first control signal comprising a comparator output signal (CMP_OUT) responsive to various inputs, as will be described below. As will be apparent, the control signal (CMP_OUT) is to indicate a desired output (VDD_M) of the PMUX $\mathbf{4}_m$ modules. That is the control signal (CMP_OUT) is to indicate how the PMUX $\mathbf{4}_m$ modules are to control VDD_M i.e. to track VCORE_L or VSHARED_M.

In the present illustrative example, the PMUX selector circuitry 12 also comprises filter circuitry 16, although this filter circuitry is optional. The filter circuitry 16 is to filter glitches or noise on the control signal (CMP_OUT) so that such glitches or noise are filtered and in the control signal SEL_VL_SELECTOR from the PMUX selector circuitry 12. As with control signal (CMP_OUT) from the comparator circuitry 14 the control signal (SEL_VL_SELECTOR) is to indicate a desired output (VDD_M) of the PMUX $\mathbf{4}_m$ modules.

Thus, the filter circuitry 16 is to provide a stable control signal (SEL_VL_SELECTOR) that is to indicate how the PMUX $\mathbf{4}_m$ modules are to control VDD_M i.e. to track VCORE_L or VSHARED_M. The operation of the filter circuitry 16 will be described in greater detail below.

Also in the present illustrative example, the system 10 optionally comprises multiplexer circuitry responsive to a selection signal (FIRMWARE_FORCE) signal, the voltage selector signal (SEL_VL_SELECTOR) from the PMUX selector circuitry 12 or the firmware voltage selector signal (SEL_VL_FIRMWARE), where the firmware voltage selector signal (SEL_VL_FIRMWARE) corresponds to the conventional techniques to control the output of the PMUX modules $\mathbf{4}_m$. Thus, the (optional) multiplexer circuitry 18 provides a way to control the PMUX modules using firmware in accordance with the conventional techniques as depicted in FIGS. 1*a* and 1*b* or using the PMUX selector circuitry 12 in accordance with the present techniques. Such functionality may be provided, for example, when required by a customer.

The PMUX selector 12 may be initiated (e.g. by software or firmware) at, for example, the beginning of a DVFS operation (or sequence) to increase VCORE_L (e.g. from $VCORE\_L_{Min}$ to $VCORE\_L_{Max}$) or to decrease the VCORE_L (e.g. from $VCORE\_L_{Max}$ to $VCORE\_L_{Min}$). In an illustrative example, the comparator circuitry 12 receives an enable signal (CMP_EN) as an input to enable the comparator circuitry.

A further enable signal in the form of a clock signal (CLK) may be provided (e.g. from clock generation circuitry in the system), where in the present illustrative example CLK comprises a low-frequency clock signal, and the output signal CMP_OUT may be output (or sampled) responsive to the CLK (e.g. on a rising and/or falling edge of a CLK pulse). The clock signal (CLK) may, in an illustrative example, be ~100 MHZ, although the claims are not limited in this respect.

In operation, the comparator circuitry 12 may be enabled when, for example, a higher VDDPE is required for the peripheral circuitry (e.g. when DVFS operation is initiated).

The PMUX selector 12 receives VCORE_L and VSHARED_M as separate inputs 18, 20 and using the comparator circuitry 14, compares VCORE_L and VSHARED_M. In the present illustrative example, when the level of VCORE_L is determined to be higher than (">") VSHARED_M, then the state of the output signal CMP_OUT will change (E.g. from high to low (from 1 to 0) or from low to high (from 0 to 1). As above, the state of the output signal CMP_OUT is to indicate a desired output of the PMUX modules $\mathbf{4}_m$.

In the present illustrative embodiment, a fixed bias (α, α<1) 18 is applied to the input VSHARED_M to generate a first biased voltage (a*VSHARED_M), and a programmable bias (α±Δ) 20 is applied to the input VCORE_L to generate a second biased voltage (α*VCORE_L±Δ).

The value of α may be set dependent on the nominal voltage. As the nominal voltage in the present illustrative example is 0.75 v, α is taken to be ¾.

The bias parameter Δ corresponds to a voltage margin, such that the comparator will not change state until VCORE_L>(VSHARED_M±Δ). The value of Δ is programmable, and an appropriate value for Δ can be set prior to runtime (e.g. dependent on performance requirements). The sign of Δ is also programmable. In other words, Δ can be added to VSHARED_M or subtracted from it.

The comparator circuitry 12 may be powered by any suitable source and in the present illustrative example the comparator circuitry 12 is depicted as being powered by VSHARED_M or a third voltage (VSYS) at input 21.

Figure 3:
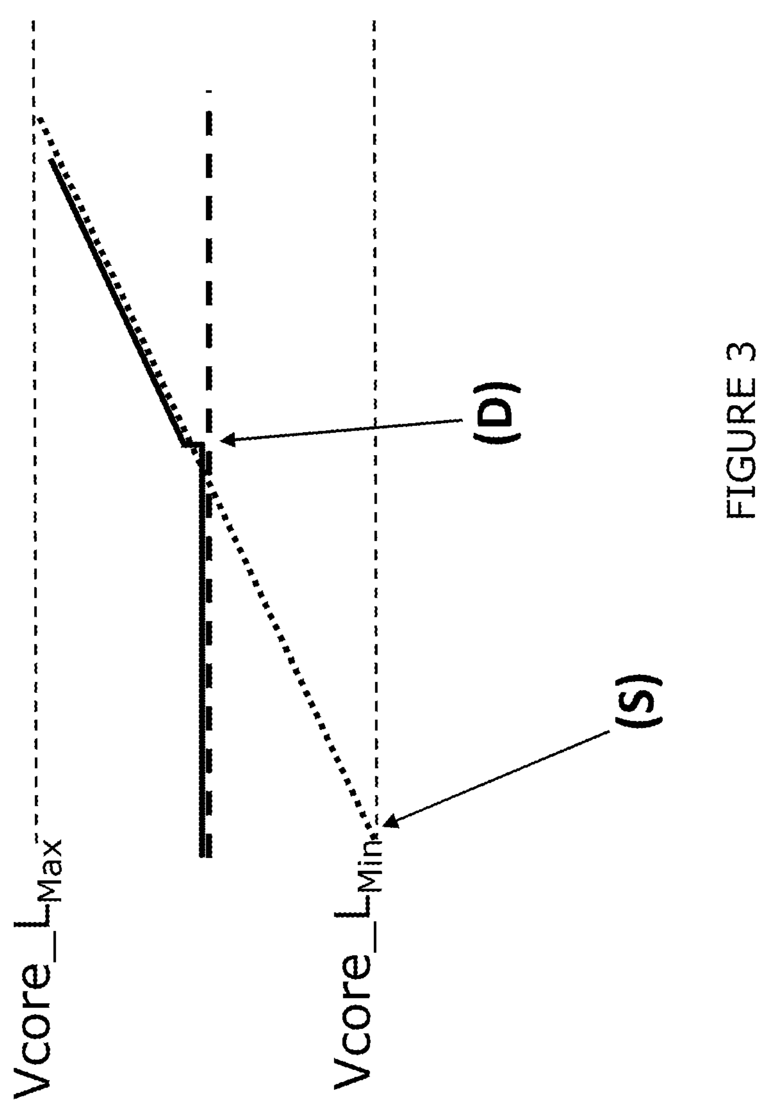
FIG. 3 shows an example waveform depicting the operation of a power multiplexer module in accordance with the present techniques.

In the illustrative example depicted in FIG. 3, software or firmware may, by providing CMP_EN, enable the comparator circuitry 12 at the beginning of a DVFS transition(S), where VCORE_L then, as depicted at(S) in FIG. 3, rises from $VCORE\_L_{Min}$ towards $VCORE\_L_{Max}$.

As depicted in FIG. 3, when at (D) the level of VCORE_L is determined to reach a threshold level (i.e. VSHARED_M±Δ in the present illustrative example), then the comparator circuitry generates control signal CMP_OUT which indicates that the output of the PMUX module (VDD_M) should switch from tracking VSHARED_M to track VCORE_L (or when the filter circuitry 16 is present, the switch is responsive to the SEL_V_SELECTOR output).

Thus, in the present illustrative example, the firmware is not required to sense when the VCORE_L is higher than VSHARED_M nor is the firmware required to sense when the VCORE_L is stable before switching the output of the PMUX module to track VCORE_L. Rather the firmware enables PMUX selector circuitry 12 in a "fire and forget" operation.

Figure 4A:
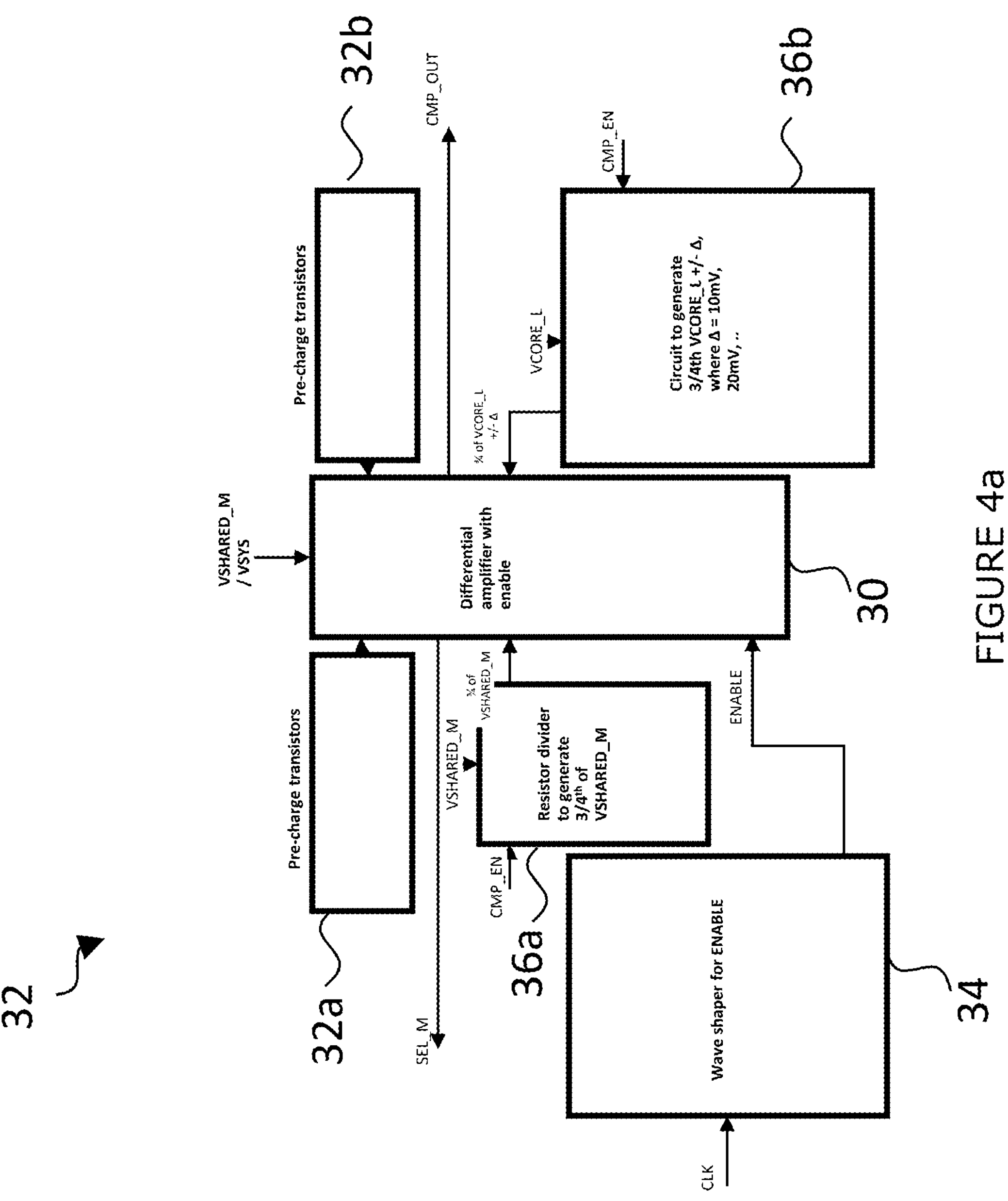
FIG. 4*a* shows an example block diagram of comparator circuitry of the selector circuitry of FIG. 2.
Figure 4B:
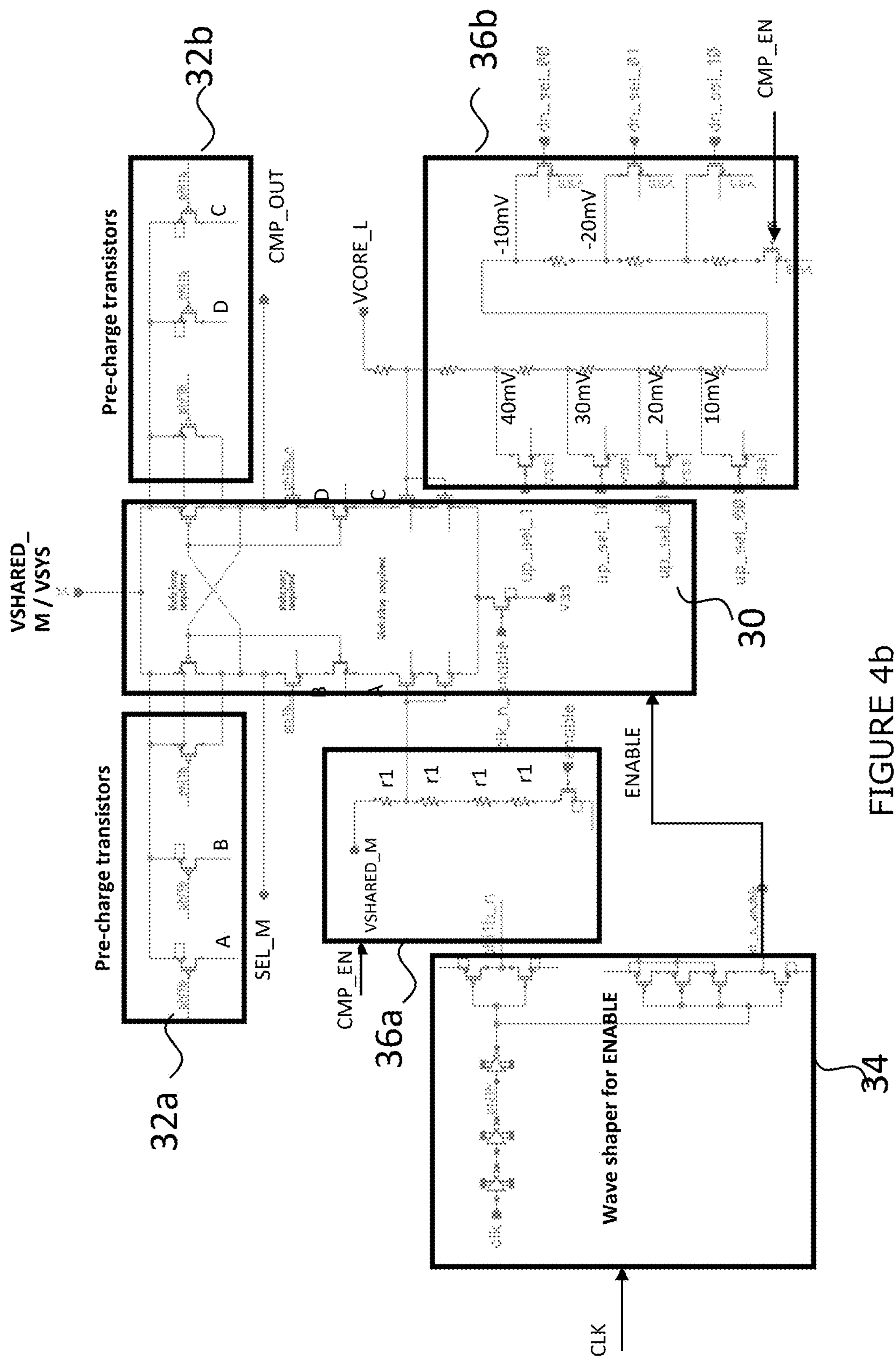
FIG. 4*b* shows an example transistor level diagram of the comparator circuitry of FIG. 4*a;*

Whilst, the description above generally describes the operation of using the PMUX selector circuitry 12 to control switching the operation of the PMUX module from tracking VSHARED_M to tracking VCORE_L responsive to increasing VCORE_L (e.g. from $VCORE\_L_{Min}$ to $VCORE\_L_{Max}$), the claims are not limited in this respect. In a further embodiment the PMUX selector circuitry 12 may also be used to control switching the operation of the PMUX module from tracking VCORE_L to tracking VSHARED_M responsive to decreasing VCORE_L (e.g. from $VCORE\_L_{Max}$ to $VCORE\_L_{Min}$). FIG. 4*a* shows an example block diagram of the comparator circuitry 14. FIG. 4*b* shows an illustrative example transistor level implementation for the block diagram of FIG. 4*a*. It will be appreciated that the present techniques may be implemented using any appropriate circuitry or logic and the claims are not limited to the illustrative examples shown in FIG. 4*a* or 4*b*.

In the present illustrative example, the comparator circuitry 14 comprises differential amplifier circuitry 30 comprising associated precharge transistor circuitry 32*a*/32*b*.

A clock signal (CLK) (e.g. low frequency clock signal) is provided as an input to wave shaper logic 34, where the output from the wave shaper logic 34 is provided as an enable signal (ENABLE) for the differential amplifier circuitry 30.

First resistor divider circuitry 36*a* is to receive VSHARED_M and responsive to control signal (CMP_EN) to apply a fixed bias α to VSHARED_M, and provide α*VSHARED_M to the differential amplifier circuitry 30.

Second resistor divider circuitry 36*b* is to receive VCORE_L and responsive to control signals (CMP_TRIM and CMP_ENABLE) is to apply a programmable bias α±Δ to VCORE_L, and provide α*VCORE_L±Δ to the differential amplifier circuitry 30. The CMP_TRIM control signal is used to set this programmable bias Δ as well as whether it is added to or subtracted from VSHARED_M. The CMP_ENABLE signal is used to switch off the resistive network to save the DC current when the PMUX_SELECTOR is not in use.

The differential amplifier circuitry 30 senses VSHARED_M and VCORE_L (e.g. responsive to the CLK signal) and outputs CMP_OUT (e.g. responsive to the CLK signal), where the state or value of CMP_OUT is to indicate that output of the PMUX modules $\mathbf{4}_m$.

Figure 5:
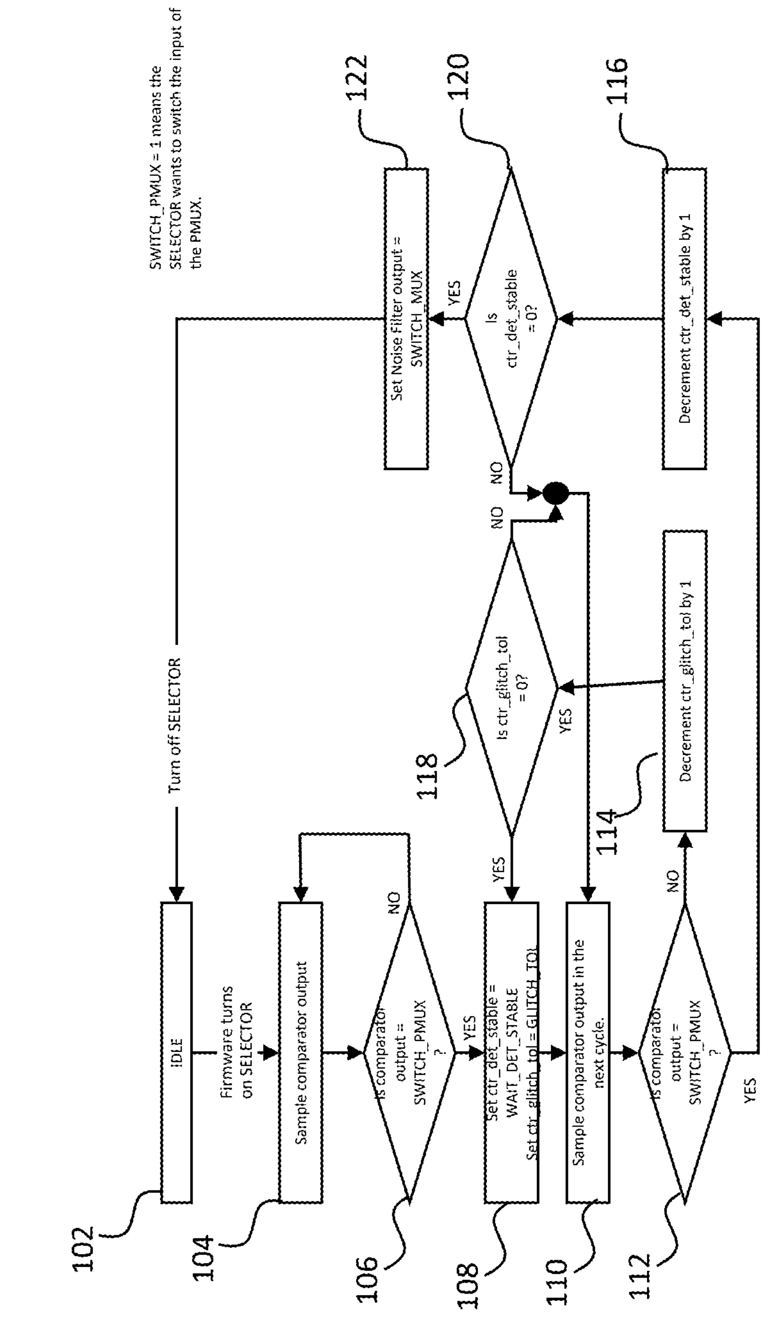
FIG. 5 shows an example flow diagram of a method of operation of the selector circuitry of FIG. 2 in accordance with the present techniques.

FIG. 5 shows an example flow diagram 100 of a method of operation of the selector circuitry of FIG. 2 in accordance with the present techniques.

At 102 the selector circuitry is idle or disabled.

At 104, responsive to a requirement to change the VDDPE (e.g. for a DVFS operation), the selector circuitry is enabled responsive to a control signal (e.g. CLK from software or firmware) and the comparator output (CMP_OUT) is sampled by the filter circuitry. The sampling may be performed responsive to a clock signal (e.g. CLK enable signal).

At 106, it is determined whether the PMUX module(s) should be switched such that VDD_M tracks VCORE_L (e.g. whether VCORE_L>VSHARED_M (±Δ)), and when NO, the comparator output is continued to be sampled as at 104.

When YES, a stability counter "ctr_det_stable" is set to a desired/acceptable stability value "WAIT_DET_STABLE" and a glitch counter "ctr_glitch_tol" is set to a desired/acceptable glitch tolerance value "GLITCH_TOL."

In the present illustrative example, the stability value "WAIT_DET_STABLE" is to specify a number of clock cycles (or sample periods) the output from the comparator (CMP_OUT) is to be stable for before the state of the SEL_VL_SELECTOR is changed (stable cycle) to indicate that VDD_M should track VCORE_L.

In the present illustrative example, the glitch tolerance value "GLITCH_TOL" is to specify a number of glitches in the output from the comparator (CMP_OUT) that will be tolerated within the stable cycle. If the number of glitches exceeds a threshold within the specified number of sample periods then the state of the SEL_VL_SELECTOR will not change.

The stability value and/or glitch tolerance value may be programmed/set by a user.

At 110, the comparator output is sampled in the next clock sample period, and as at 112 it is determined whether the comparator output (CMP_OUT) is to switch the PMUX (e.g. SWITCH_PMUX=1). When NO, at 114 the value of glitch counter "ctr_glitch_tol" is altered (i.e. decremented by 1 in the present illustrative example) and when YES, at 116, the value of the stability counter "ctr_det_stable" is altered (i.e. decremented by 1 in the present illustrative example).

At 118, it is determined whether the glitch counter "ctr_glitch_tol" is equal to 0. When YES, the flow returns to 108 and when NO, the flow returns to 110.

At 120, it is determined whether the stability counter "ctr_det_stable" is equal to 0. When YES, at 122, the filter circuitry output SEL_VL_SELECTOR is set to indicate that output VDD_M of the PMUX module(s) should track VCORE_L, and, when NO, the flow returns to 110.

When the filter circuitry issues the control signal to control the output of the PMUX module, the selector circuitry can be disabled (e.g. to save power).

Figure 6:
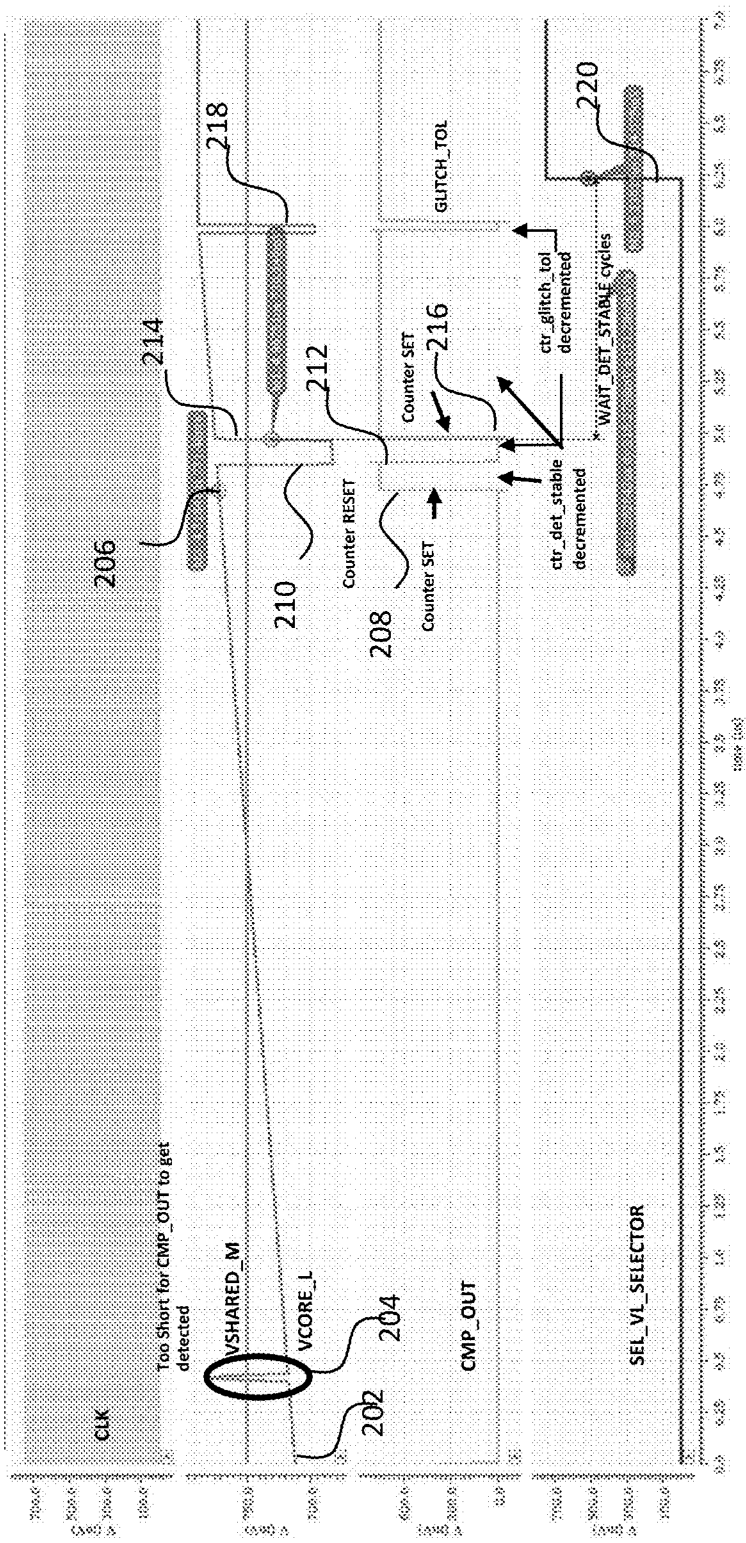
FIG. 6 shows example waveforms depicting the operation of the selector circuitry of FIG. 2 in accordance with the present techniques.

FIG. 6 shows example a waveform diagram 200 depicting the operation of the selector circuitry of FIG. 2 in accordance with the present techniques.

At 202 VCORE_L the PMUX selector 12 may initiate (e.g. by software or firmware) an increase in VCORE_L (e.g. for a DVFS operation).

In the present illustrative example, the CLK signal is a relatively low frequency clock signal, and as the outputs of the comparator are sampled responsive to the CLK signal, relatively high frequency noise or spikes as depicted at 204 may not be detected. Thus, the noise at 204 does not have any effect on the output from the filter circuitry and may be taken to have been filtered.

When VCORE_L is determined to be greater than VSHARED_M+Δ (as depicted at 206) a stability counter "ctr_det_stable" is set to a desired/acceptable stability value "WAIT_DET_STABLE" (as depicted at 208).

When, VCORE_L falls below VSHARED_M+Δ (as depicted at 210) for successive sample periods such that the glitch counter "ctr_glitch_tol" decrements to zero, the stability counter resets (as depicted at 212).

As at 206, when at 214 VCORE_L is determined to be greater than VSHARED_M+Δ the stability counter "ctr_det_ stable" is set to the stability value "WAIT_DET_STABLE" (as depicted at 216).

Although there is a glitch in VCORE_L as depicted at 218, the glitch counter "ctr_glitch_tol" does not decrement to 0, and when the stability counter decrements to zero over the subsequent sample periods, the state of the SEL_VL_SELECTOR value is changed (as depicted at 220) to indicate that output VDD_M of the PMUX module(s) should track VCORE_L.

Thus the functionality described herein provides for firmware to enable control circuitry (PMUX selector circuitry), which is to control operation of an associated power multiplexer circuit, to control the output VDD_M to track different voltages (e.g. VCORE_L or VSHARED_M). The firmware can enable the control circuitry when the PMUX modules are required to supply a higher VDDCE voltage than the nominal voltage to the cell circuitry (e.g. for a DVFS operation when a higher VDDPE is supplied to the peripheral circuitry).

By using such control circuitry to determine the level of VCORE_L relative to VSHARED_M, the firmware does not have to perform the comparison nor does the firmware have to determine when VCORE_L is stable relative to VSHARED_M. Thus, the transition or switch from VDD_M tracking VSHARED_M to VDD_M tracking VCORE_L is faster.

Furthermore, the control circuitry can me disabled or switched off after the VDD_M switches to track VCORE_L to reduce power consumption.

Figure 7:
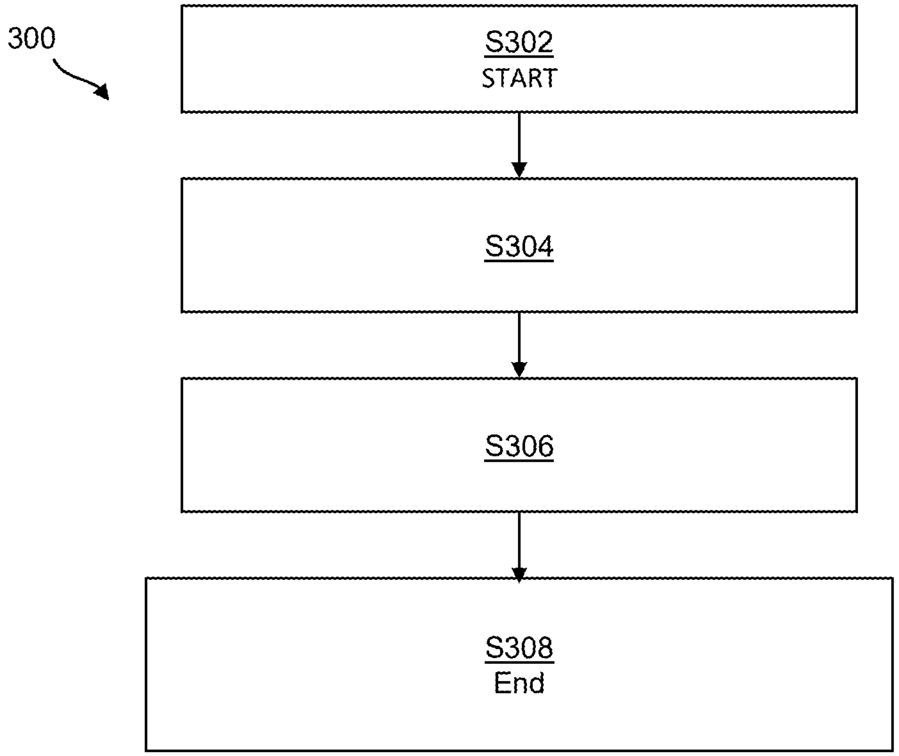
FIG. 7 is a flow diagram for providing selector circuitry in accordance with the present techniques.

FIG. 7 illustrates a flow diagram of a method 300 for providing a storage system in accordance with various implementations described herein.

It should be understood that even though method 300 may indicate a particular order of operation execution, in some cases, various certain portions of the operations may be executed in a different order, and on different systems. In other cases, additional operations and/or steps may be added to and/or omitted from method 300.

Also, method 300 may be implemented in hardware and/or software. When implemented in hardware, the method 300 may be implemented with various circuit elements, such as described herein above in reference to FIGS. 4*a* and 4*b*. When implemented in software, the method 300 may be implemented as a program and/or software instruction process that may be configured for providing selector circuitry design techniques as described herein. Also, when implemented in software, instructions related to implementing the method 300 may be stored in memory and/or a database. For instance, a computer or various other types of computing devices having a processor and memory may be configured to perform method 300.

As described and shown in reference to FIG. 7, method 300 may be utilized for fabricating and/or manufacturing, or causing to be fabricated and/or manufactured, an integrated circuit (IC) that implements selector circuitry and techniques as described herein that are related to providing selector circuitry architecture and/or various associated systems, devices, components, circuits and related architecture.

At S302, method 300 starts.

At S304, method 350 may provide, selector circuitry comprising a comparator to compare a first voltage with a second voltage and provide a control signal responsive to the comparison, where the further control signal is to indicate the desired output (VDD_M) of an associated power multiplexer circuit.

At S306, method 300 may provide filter circuitry to filter glitches or noise on the comparator output signal and provide a further control signal, where the further control signal is to indicate the desired output (VDD_M) of the associated power multiplexer circuit.

At S308, method 300 ENDS.

As will be appreciated by one skilled in the art, the present technology may be embodied as a method, a circuit or a computer readable medium comprising data and imperatives to cause construction of a circuit. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

The present techniques described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCS, minicomputers, mainframe computers, smart phones, tablets, wearable computers, cloud computing systems, virtual computers, marine electronics devices, and the like.

The present techniques described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Figure 8:
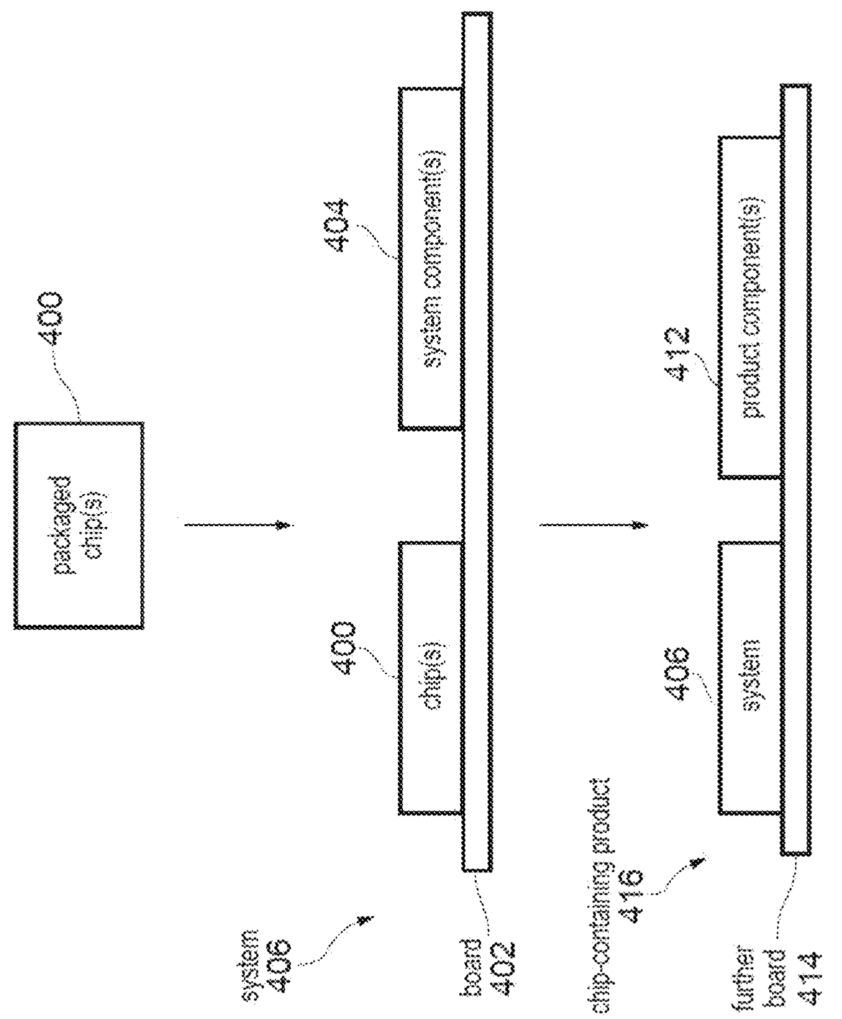
FIG. 8 shows a system and a chip-containing product.

As an illustrative example, as shown in FIG. 8, one or more packaged chips 400, with the circuitry described above implemented on one chip or distributed over two or more of the chips, may be manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the circuitry described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

As will be appreciated by one skilled in the art, the present technology may be embodied as a method, a circuit or a computer readable medium comprising data and imperatives to cause construction of a circuit. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL)

abstraction of one or more logic circuits for defining an apparatus embodying the concepts. The code may define an HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. Control circuitry for controlling operation of an associated power multiplexer circuit, the control circuitry comprising:

a first input to receive a first voltage;

a second input to receive a second voltage; and comparator circuitry to determine the level of the first voltage relative to the second voltage and to generate a first control signal when the second voltage reaches a first threshold level relative to the first voltage, where the first control signal is to indicate a desired output of the associated power multiplexer circuit, wherein the control circuitry is configured to apply a first bias to the first voltage and a second bias to the second voltage.

2. The control circuitry of claim 1 further comprising a third input to receive an enable signal from firmware to cause the comparator circuitry to sense the level of the first voltage relative to the second voltage.

3. The control circuitry of claim 1, where the first bias comprises a fixed bias.

4. The control circuitry of claim 1, where the second bias comprises a programmable bias.

5. The control circuitry of claim 1, where the comparator circuitry is to generate the first control signal when the second voltage reaches a first threshold level.

6. The control circuitry of claim 1 further comprising filter circuitry to filter one or more glitches or noise in the first control signal and to generate a second control signal, where the second control signal is to indicate the desired output of the associated power multiplexer circuit.

7. The control circuitry in accordance with claim 6, where the filter circuitry is to sample the first control signal in accordance with a sample period, where the sample period comprises one or more pulses of a clock signal.

8. The control circuitry in accordance with claim 7, where the filter circuitry is to initiate a first counter responsive to the second voltage reaching a first level relative to the first voltage in a first sample period.

9. The control circuitry in accordance with claim 8, where the filter circuitry is to alter the first counter responsive to the second voltage exceeding the first level in one or more subsequent sample periods.

10. The control circuitry in accordance with claim 9, where the filter circuitry is to output the second control signal responsive to the first counter reaching a first threshold level in the one or more subsequent sample periods.

11. The control circuitry in accordance with claim 8, where the filter circuitry is to initiate a second counter responsive to the second voltage reaching a second level relative to the first voltage in the one or more subsequent sample periods.

12. The control circuitry in accordance with claim 11, where the filter circuitry is to alter the second counter responsive to the second voltage falling below the first level in the one or more subsequent sample periods.

13. The control circuitry in accordance with claim 12, where the filter circuitry is to reset the first counter responsive to the second counter reaching a second threshold level within a specified number of sample periods.

14. A method of operating control circuitry for controlling operation of an associated power multiplexer circuit, the method comprising:

receiving a first input comprising first voltage;

receiving a second input comprising a second voltage;

applying a first bias to the first voltage and a second bias to the second voltage;

determining, using comparator circuitry, a level of the first voltage relative to the second voltage; and generating a first control signal when the second voltage reaches a first threshold level relative to the first voltage, where the first control signal is to indicate a desired output of the associated power multiplexer circuit.

15. A power control system comprising:

power multiplexer circuitry comprising:

a first input to receive a first voltage;

a second input to receive a second voltage;

an output to provide a third voltage, where the output is to track the first voltage or the second voltage responsive to a first control signal; and control circuitry comprising:

a first input to receive the first voltage;

a second input to receive the second voltage;

comparator circuitry to determine the level of the first voltage relative to the second voltage and to generate the first control signal when the second voltage reaches a first threshold level relative to the first voltage, where the first control signal is to indicate a desired output of the associated power multiplexer circuit, wherein the control circuitry is configured to apply a first bias to the first voltage and a second bias to the second voltage.

16. A system comprising: the circuitry of claim 1, implemented in at least one packaged chip; at least one system component; and a board, wherein the at least one packaged chip and the at least one system component are assembled on the board.

17. A chip-containing product comprising the system of claim 16 assembled on a further board with at least one other product component.

18. A non-transitory computer-readable medium to store computer-readable code for fabrication of the circuitry claim 1.

* * * * *